United States Patent
Herrmann et al.

(10) Patent No.: US 7,650,336 B1
(45) Date of Patent: Jan. 19, 2010

(54) FILE SYSTEM ATOMIC LOCK

(75) Inventors: Eric Manaolana Herrmann, Greenbrae, CA (US); Darrick P. Brown, Redwood City, CA (US)

(73) Assignee: Adobe Systems Incorporated, San Jose, CA (US)

(\*) Notice: Subject to any disclaimer, the term of this patent is extended or adjusted under 35 U.S.C. 154(b) by 997 days.

(21) Appl. No.: 11/002,729

(22) Filed: Dec. 2, 2004

(51) Int. Cl.
*G06F 17/30* (2006.01)
(52) U.S. Cl. .......................................... 707/8; 709/205
(58) Field of Classification Search ................ 707/2, 707/3, 7, 8, 10, 102; 709/202, 203, 217, 709/218, 225, 205
See application file for complete search history.

(56) References Cited

U.S. PATENT DOCUMENTS

| 5,095,423 | A | \* | 3/1992 | Gramlich et al. ................ 707/8 |
| 5,692,178 | A | \* | 11/1997 | Shaughnessy ................... 707/8 |
| 6,230,185 | B1 | \* | 5/2001 | Salas et al. ................... 709/205 |

\* cited by examiner

*Primary Examiner*—Shahid A Alam

(57) ABSTRACT

A locking mechanism for an electronic file creates a key file for each electronic file stored on a file system. The key file is created when the electronic file is loaded or first created on the system. As a user requests to edit the electronic file, the file system is requested to rename the key file with a lock. If the file system returns an error in response to the request to rename, the user is informed that the electronic file is locked or inaccessible. If the system successfully renames the key file, the user is allowed access to the electronic file.

10 Claims, 2 Drawing Sheets

FILE SYSTEM ATOMIC LOCK

TECHNICAL FIELD

The present invention relates, in general, to file systems, and more particularly, to a system and method for an atomic lock on file systems.

BACKGROUND OF THE INVENTION

Modern software applications are generally designed to work across local and remote networks for implementing the functionality of the application. Such software applications typically use remote file systems to store shared resources and files. These shared resources are generally accessed through server protocols such as File Transfer Protocol (FTP), Secure FTP (SFTP), Local Area Network (LAN), and the like. When a user desires to edit or modify such a shared file, the file is typically downloaded from the remote file system, edited or modified by the user, and then stored back onto the remote file system using the server protocol.

While this remote editing procedure allows users to edit such remotely stored, shared documents, it is also possible that two or more users of the remote file system each may wish to modify the same document at the same time. If this happens, it may be possible for the users to inadvertently overwrite the other's changes. In order to prevent such overwriting, locking mechanisms have been developed that lock the resource being used so that other users cannot download and/or modify the document while it is checked out and locked. Similar locking mechanisms have been built into newer server protocols used in newer remote file systems, such as Web Distributed Authoring and Versioning (WebDAV) systems. Moreover, native or local file systems, such as MICROSOFT CORPORATION's NT File System (NTFS), have also developed locks to prevent multiple users from operating on the same document. In such cases, locking features have simply been developed and/or included within new applications and system.

Operating system developers have also attempted to address this problem through the development of the atomic lock or test-and-set principle. When a call is made to edit or access a shared resource, the system tests to determine if a lock can be acquired (i.e., the "test"), and, if so, acquires the lock (i.e., the "set"), returning the results of the operation. In such operating systems, the developers were able to code the test-and-set process as a single operating system operation. Thus, it generally executes very quickly. A single system operation is sometimes referred to as an atomic operation. However, even though these newer protocols and file systems have been specifically developed with direct, atomic locking features, there are still numerous file systems implemented using existing technologies, such as FTP and SFTP, that typically have no efficient, reliable means for locking files.

BRIEF SUMMARY OF THE INVENTION

The present invention is directed to a system and method for locking files in a file system. Where multiple users are allowed or expected to work on the same documents or projects, the file system that maintains the files, documents, or other works-in-progess (WIPs) may include a locking mechanism to ensure that two users do not access the same files at the same time, or overwrite any existing edits or changes. The locking mechanism implemented in the various embodiments of the present invention leverages the renaming function of the existing file system to create a file lock.

In one representative embodiment of the present invention, a key or index file is created for each electronic file stored or loaded on the file system. Each key or index file is associated with that particular file. When a user indicates he or she wishes to edit a file, the file locking mechanism of the file system attempts to rename the key file that is associated with the selected file to a name that indicates it is locked, such as a lock name or lock designator. If the rename command is unsuccessful, i.e., the file system returns an error because the key file has already been renamed, the user is instructed that he or she cannot edit that particular file. If, however, the rename command is completed successfully, the user is granted access to the desired file. Once the user is finished editing, he or she may then unlock the file by renaming the key file back to the original key file name. Thus, with a single call to the file system, a lock may be established.

Additional representative embodiments of the present invention may leverage the renaming features of the file system without the use of an intermediary or key file. In such embodiments, the file itself is renamed when requested by the user. Therefore, when other users request to edit the same file, they are prevented from accessing it. Various different methods or naming conventions may be used to implement this rename-locking.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated that the conception and specific embodiment disclosed may be readily utilized as a basis for modifying or designing other structures for carrying out the same purposes of the present invention. It should also be realized that such equivalent constructions do not depart from the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which.

DETAILED DESCRIPTION OF THE INVENTION

Remote filing systems, such as FTP and SFTP, typically have simple sets of operations, such as EXISTS, GET, PUT, MOVE, DELETE, RENAME, and the like. Each of these operations may be atomic, but only some of them are accurate, meaning that some of these operations may return an error. For example, a RENAME, GET, MOVE, or DELETE command issued for a file that does not exist will typically return an error. Locking mechanisms have been developed in various development environments, such as MACROMEDIA INC.'s DREAMWEAVER™, to operate with the limitations of such existing file systems. In previous versions of DREAMWEAVER™, which is a Web page development environment or tool, users may work in teams developing the target Web site or page and, thus, be working on the same document. Locking, in such a collaborative environment, is advisable to prevent inadvertently overwriting or deleting another developer's work.

Figure 1A:
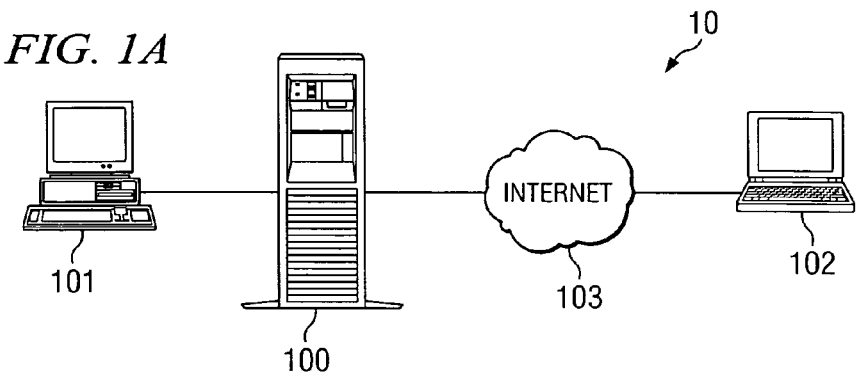
FIG. 1A is a block diagram illustrating a file system.

FIG. 1A is a block diagram illustrating file system 10. File system 10 uses central computer 100 to store and manage files and documents. These documents may be accessed locally via a local area network (LAN) by users such as user 101 or may be accessed remotely via a data network, such as Internet 103 by user 102. The file system running and managing the stored files and documents assist users 101 and 102 to interact with those files and documents.

Figure 1B:
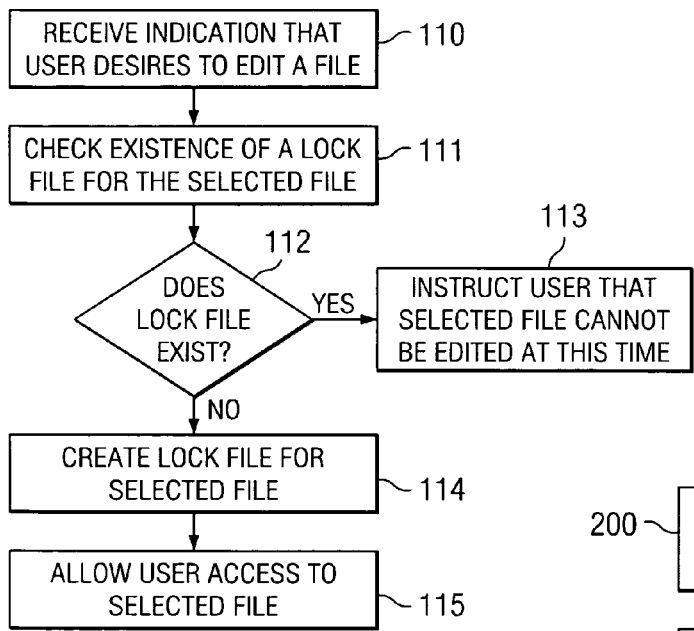
FIG. 1B is a flowchart listing example steps performed in executing a locking mechanism for existing file systems.

FIG. 1B is a flowchart listing example steps performed in executing a locking mechanism for existing file systems. In step 110, an indication is received that a user desires to edit a particular file. A command is issued to the file system, in step 111, relating to the existence of a lock file for the selected file. In step 112, a determination is made based on the file system response, whether such a lock file exists. If a lock file is found, the user is instructed, in step 113, that the selected file cannot be accessed and/or edited at this point. If, however, no lock file exists, a lock file is created, in step 114, corresponding to the selected file. In step 115, the user is then allowed access to the selected file.

This method for locking a remote file system has been used in development environments, such as in previous versions of DREAMWEAVER™. For example, if a user selects to edit a file named "myfile.html," DREAMWEAVER™ creates another file named "myfile.html.lck." This locking file also may contain information about who created the lock. When the user desires to edit the file, a check is first made to determine whether the file "myfile.html.lck" exists. If it does exist, then the DREAMWEAVER™ knows that the file is currently being edited and would prevent the user or developer from accessing or editing the file. However, if the file does not exist, the user may retrieve and edit the file as usual. When the user actually loads the desired file, DREAMWEAVER™ creates the lock file "myfile.html.lck," which locks further editing of "myfile.html."

This applied process of locking files in such limited remote file systems is generally effective as long as several users do not attempt to acquire the lock at the same time. For example, if two or more users or developers on a particular workflow group receive a notification that a draft Web page is ready to be reviewed, a possibility exists that two or more of these users may attempt to test and create the lock on the file at the same time. A situation exists in which both users may believe that they each have the lock. This is a synchronization or concurrency problem that is well known in the field of Operating Systems.

For example, user A may select to edit the "myfile.html" document. User A's development environment, which may be a previous version of DREAMWEAVER™, or some similar development tool, performs an EXIST command on the file system to check for the existence of the "myfile.html.lck" file. User B also selects to edit "myfile.html." These remote filing systems typically execute commands sequentially as they are received. It is, therefore, possible that user B's development environment next performs an EXIST command on the file system also to check for the existence of "myfile.html.lck." Because user A has not actually locked the file yet, "myfile.html.lck" does not currently exist, and both user A and user B receive an indication that "myfile.html" is currently not locked. User A creates the lock file "myfile.html.lck" storing, at least, his or her identity in the file. However, because user B also received an indication that "myfile.html" was not locked, user B also creates the lock file "myfile.html.lck" storing, at least, his or her identity therein. Thus, user B has essentially overwritten the locking information causing both parties to believe they have a lock on the same file, when, in fact, only user B has the lock.

Inserting a file-read step to verify the contents of the lock file may alleviate some of the problems that arise with the current locking mechanisms. However, crossed file locks may still occur. For example, if user A triggers the creation of the lock file and then performs a read of that file before any of user B's commands are executed, user A would find nothing wrong with the contents of the lock file. Thereafter, because user A and user B both initially received validation that "myfile.html" was not locked, user B would overwrite the lock file just created and verified by user A. When user B steps to read the lock file, he or she would also verify that the lock file was correct. Again, even with the added read step, cross-locking problems could occur.

It is conceivable that a number of additional steps could be added to the existing locking processes to ensure that a lock would always be valid. However, each step that is added to a locking mechanism adds a call to the file system. Each file system call takes a certain amount of time to perform. Therefore, the more calls to the file system, the longer, and less efficient, the locking mechanism would become. It is typically more desirable to have a locking mechanism that is as close to atomic as possible in order to increase the efficiency of the file lock and the retrieval/editing of the file.

Figure 2:
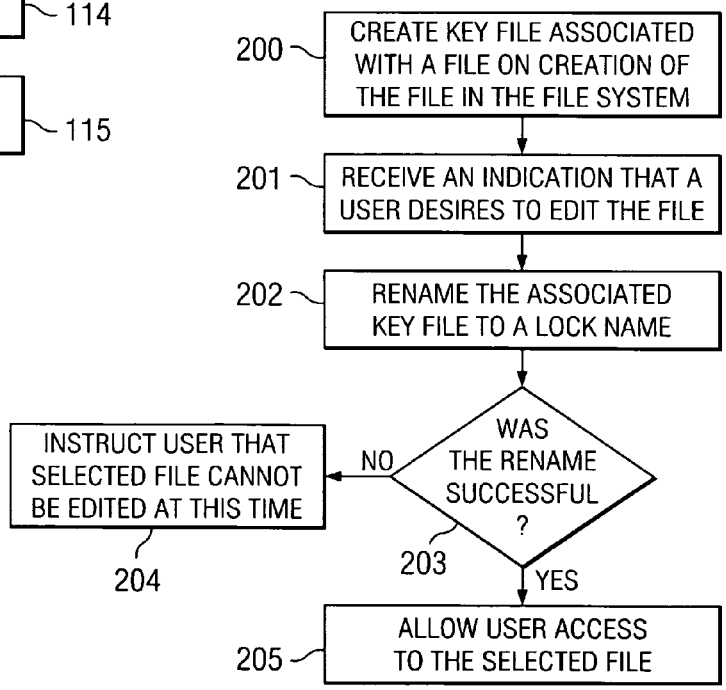
FIG. 2 is a flowchart listing example steps performed in implementing a locking system configured according to one embodiment of the present invention.

FIG. 2 is a flowchart listing example steps performed in implementing a locking system configured according to one embodiment of the present invention. In step 200, when the files are first placed or loaded onto the file system, a key file or index file is created that is associated with each file. In step 201, an indication is received that a user desires to edit one of the files. A rename command is issued, in step 202, for the file system to rename the key file associated with the selected file to a lock name or designator. In step 203, a determination is made whether the rename command was successful. If not, the user is instructed, in step 204, that the selected file cannot be edited at this time. If the rename was successful, the user is allowed access to the selected file in step 205.

In example operation of the embodiment described in FIG. 2, when a file is stored on the file system the first time, a key file is created that is associated with the underlying file. The described embodiment may be implemented in various Web-related software applications, such as MACROMEDIA INC.'s CONTRIBUTE™, DREAMWEAVER™, and the like. For instance, if "yourfile.html" were stored on the file system, the system would create the associated key file, "yourfile.html.fre." After its creation, if user A desired to edit "yourfile.html," the file system renames the key file, "yourfile.html.fre" to some lock file, such as "yourfile.html.fre.lck.A@macromedia.com." In the described example, the file system uses ".lck" to indicate a locked file as well as the email address of the requesting user, A@macromedia.com. Thereafter, if user B desired also to edit "yourfile.html," the system would attempt to rename "yourfile.html.fre," which no longer exists, named as such, on the file system. Because user A has already renamed "yourfile.html.fre," the file system returns an error message that is used to indicate to user B that he or she cannot edit "yourfile.html" at this time. Because the embodiment of the present invention locks the file in a single, atomic step, sequential requests for edit issued by user A and user B will not result in a cross-lock.

It should be noted that the naming conventions used in the examples are merely to illustrated the various claimed embodiments. Additional and/or alternative embodiments of the present invention may use different naming conventions in order to implement the inventive aspects. The various embodiments of the present invention are not intended to be limited to the examples described herein.

Figure 3:
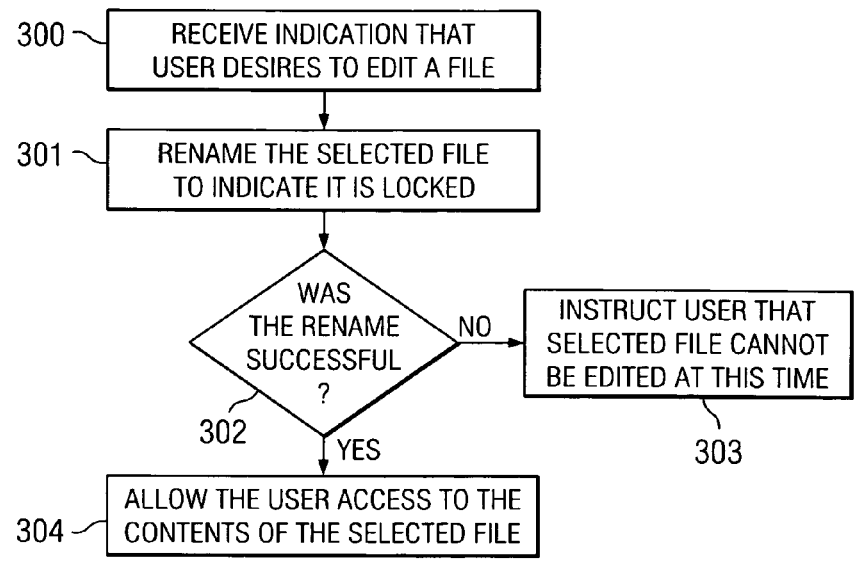
FIG. 3 is a flowchart listing example steps performed in implementing a file system configured according to another embodiment of the present invention.

FIG. 3 is a flowchart listing example steps performed in implementing a file system configured according to another embodiment of the present invention. Instead of creating a key or index file, as disclosed with respect to the embodiment described in FIG. 2, the file system described in FIG. 3 operates directly on the resident file. In step 300, an indication is received by a user that he or she desires to edit a particular file. A rename command is issued, in step 301, to the file system to rename the selected file to indicate it is locked by the user. A determination is made, in step 302, whether the rename command was successful. If not, the user is instructed, in step 303, that the selected file cannot be edited at this time. If the rename was successful, the user is allowed access to the contents of the selected file in step 304.

The program or code segments making up the various embodiments of the present invention may be stored in a computer readable medium or transmitted by a computer data signal embodied in a carrier wave, or a signal modulated by a carrier, over a transmission medium. The "computer readable medium" may include any medium that can store or transfer information. Examples of the computer readable medium include an electronic circuit, a semiconductor memory device, a ROM, a flash memory, an erasable ROM (EROM), a floppy diskette, a compact disk CD-ROM, an optical disk, a hard disk, a fiber optic medium, a radio frequency (RF) link, and the like. The computer data signal may include any signal that can propagate over a transmission medium such as electronic network channels, optical fibers, air, electromagnetic, RF links, and the like. The code segments may be downloaded via computer networks such as the Internet, Intranet, and the like.

Figure 4:
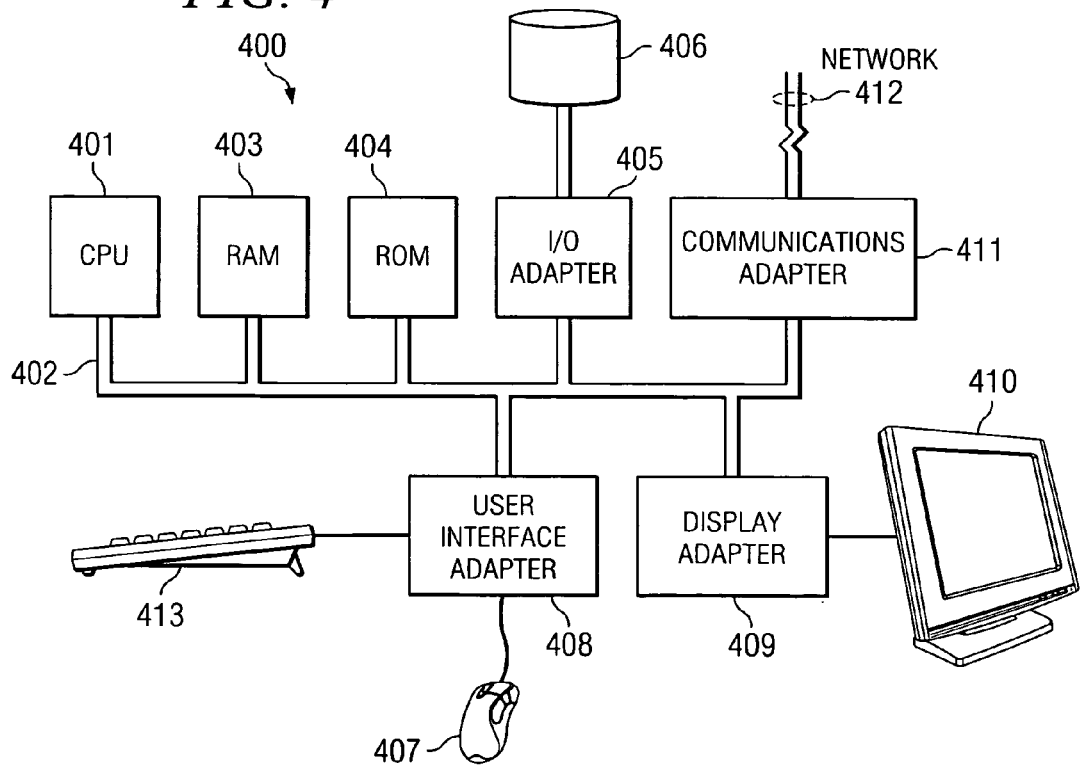
FIG. 4 illustrates a computer system adapted to use embodiments of the present invention.

FIG. 4 illustrates computer system 400 adapted to use embodiments of the present invention, e.g. storing and/or executing software associated with the embodiments. Central processing unit (CPU) 401 is coupled to system bus 402. The CPU 401 may be any general purpose CPU. However, embodiments of the present invention are not restricted by the architecture of CPU 401 as long as CPU 401 supports the inventive operations as described herein. Bus 402 is coupled to random access memory (RAM) 403, which may be SRAM, DRAM, or SDRAM. ROM 404 is also coupled to bus 402, which may be PROM, EPROM, or EEPROM. RAM 403 and ROM 404 hold user and system data and programs as is well known in the art.

Bus 402 is also coupled to input/output (I/O) controller card 405, communications adapter card 411, user interface card 408, and display card 409. The I/O adapter card 405 connects storage devices 406, such as one or more of a hard drive, a CD drive, a floppy disk drive, a tape drive, to computer system 400. The I/O adapter 405 is also connected to a printer (not shown), which would allow the system to print paper copies of information such as documents, photographs, articles, etcetera. Note that the printer may be a printer (e.g., dot matrix, laser, etcetera), a fax machine, scanner, or a copier machine. Communications card 411 is adapted to couple the computer system 400 to a network 412, which may be one or more of a telephone network, a local (LAN) and/or a wide-area (WAN) network, an Ethernet network, and/or the Internet network. User interface card 408 couples user input devices, such as keyboard 413, pointing device 407, etcetera, to the computer system 400. The display card 409 is driven by CPU 401 to control the display on display device 410.

Although the present invention and its advantages have been described in detail, it should be understood that various changes, substitutions and alterations can be made herein without departing from the invention as defined by the appended claims. Moreover, the scope of the present application is not intended to be limited to the particular embodiments of the process, machine, manufacture, composition of matter, means, methods and steps described in the specification. As one will readily appreciate from the disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A method for locking an electronic file comprising:
   creating a key file associated with said electronic file when said electronic file is loaded onto a file system; and
   renaming said key file with a lock designator responsive to a user requesting to edit said electronic file.

2. The method of claim 1 further comprising:
   instructing said user that said electronic file is inaccessible responsive to an error received from said file system in response to said renaming.

3. The method of claim 1 further comprising:
   opening said electronic file to said user responsive to successfully renaming said key file.

4. The method of claim 1 further comprising:
   replacing said lock designator with a name of said key file responsive to said user completing said editing.

5. The method of claim 1 wherein said lock designator identifies said user.

6. A method for locking an electronic file comprising:
   receiving a request from a user to edit said electronic file on a file system; and
   renaming said electronic file with a lock name responsive to said user request.

7. The method of claim 6 further comprising:
   instructing said user that said electronic file is inaccessible responsive to receiving an error from said file system in response to said renaming.

8. The method of claim 6 further comprising:
   opening said file to said user responsive to successful renaming.

9. The method of claim 6 further comprising:
   replacing said lock name with a name of said electronic file responsive to said user completing said editing.

10. The method of claim 6 wherein said lock name identifies said user.

\* \* \* \* \*